(12) United States Patent
Mauro et al.

(10) Patent No.: US 6,279,560 B1
(45) Date of Patent: Aug. 28, 2001

(54) METHOD OF CONTROLLING INJECTION OF AN INTERNAL COMBUSTION ENGINE AS A FUNCTION OF FUEL QUALITY

(75) Inventors: Marco Mauro, San Remo; Ugo Bolla; Francesco Pastorelli, both of Turin; Nelson Santamaria, Beinasco; Marco Ciasullo, Turin, all of (IT)

(73) Assignee: C.R.F. Società Consortile per Azioni, Orbassano (IT)

( * ) Notice: Subject to any disclaimer, the term of this patent is extended or adjusted under 35 U.S.C. 154(b) by 0 days.

(21) Appl. No.: 09/428,520

(22) Filed: Oct. 28, 1999

(30) Foreign Application Priority Data

Oct. 28, 1998 (IT) ............................................. TO98A0912

(51) Int. Cl.$^7$ .................................................. F02D 41/14
(52) U.S. Cl. ............................................................ 123/674
(58) Field of Search ..................... 123/674, 675, 123/486, 487, 672; 701/104, 109

(56) References Cited

U.S. PATENT DOCUMENTS

| | | | |
|---|---|---|---|
| 4,738,238 | 4/1988 | Ohishi | 123/486 |
| 4,901,240 | 2/1990 | Schmidt et al. | 364/431.06 |
| 5,094,208 | 3/1992 | Adam et al. | 123/406 |
| 5,197,451 | 3/1993 | Yoshida et al. | 123/696 |
| 5,263,464 | * 11/1993 | Yoshida et al. | 123/674 |
| 5,464,000 | * 11/1995 | Pursifull et al. | 123/674 |
| 5,467,755 | 11/1995 | Konrad et al. | 123/674 |
| 6,076,037 | * 6/2000 | Ono et al. | 123/674 |

FOREIGN PATENT DOCUMENTS 3-233151  10/1991  (JP).

* cited by examiner

Primary Examiner—Andrew M. Dolinar
Assistant Examiner—Arnold Castro
(74) Attorney, Agent, or Firm—Crowell & Moring LLP

(57) ABSTRACT

A method of controlling injection of an engine having an oxygen concentration sensor generating a composition signal correlated to the composition of the exhaust gases, and a number of injectors for injecting fuel for an operating injection time in each operating state of the engine, and each of which is assigned, in each operating state of the engine, a respective calibration injection time determined at an initial engine calibration stage using a reference fuel. In a given operating state of the engine, the control method including the steps of: determining a number of operating values of a control parameter as a function of the composition signal and of a proportional-integral control function; determining an intermediate value of the control parameter as a function of the aforementioned operating values of the control parameter; determining a current correction injection time as a function of the intermediate value of the control parameter, and of a reference value of the control parameter determined at the initial engine calibration stage using the reference fuel and relative to the operating state of the engine; and determining an operating injection time as a function of a calibration injection time relative to the operating state of the engine, of a closed-loop injection time depending on the control parameter, and of the current correction injection time.

22 Claims, 2 Drawing Sheets

METHOD OF CONTROLLING INJECTION OF AN INTERNAL COMBUSTION ENGINE AS A FUNCTION OF FUEL QUALITY

The present invention relates to a method of controlling injection of an internal combustion engine as a function of fuel quality.

BACKGROUND OF THE INVENTION

As is known, the quality of a fuel, i.e. its chemical and physical characteristics (chemical composition, stoichiometric air/fuel ratio, density and heat value) as a whole, may vary significantly and at times in ways that are unpredictable by the user, and depends on numerous factors, including: different supply sources, different climatic conditions, season-dependent supply factors, different percentages of inert material, different fuel mixtures, etc.

Consequently, in currently marketed vehicles—in which, as is known, the operating injection time of an injector in each operating state of the engine equals a calibration injection time determined at the initial engine calibration stage using a reference fuel, plus a closed-loop injection time correlated to the composition of the exhaust gases produced by the engine—any alteration in fuel quality may affect the behaviour of the engine in terms of performance and emissions and in direct proportion to the extent to which the fuel used differs from the reference fuel used to calibrate the engine.

SUMMARY OF THE INVENTION

It is an object of the present invention to provide an injection control method capable of automatically determining the quality of the fuel used and adapting injection accordingly.

According to the present invention, there is provided a method of controlling injection of an internal combustion engine comprising a number of injectors for injecting fuel for a respective operating injection time in each operating state of the engine, and an oxygen concentration sensor generating a composition signal correlated to the oxygen difference in the exhaust gases with respect to a stoichiometric condition; each of said injectors being assigned, in each operating state of the engine, a respective calibration injection time determined at an initial engine calibration stage using a reference fuel; for a given operating state of said engine, said method being characterized by comprising the steps of:

a) determining a number of operating values of a control parameter as a function of said composition signal and of a proportional-integral control function;

b) determining an intermediate value of said control parameter as a function of said number of operating values of the control parameter;

c) determining a current correction injection time as a function of said intermediate value of said control parameter and of a reference value of the control parameter determined at said initial engine calibration stage using said reference fuel and relative to said operating state of the engine; and d) determining said operating injection time for said operating state of the engine as a function of a respective said calibration injection time; of a closed-loop injection time depending on said composition signal; and of said current correction injection time.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
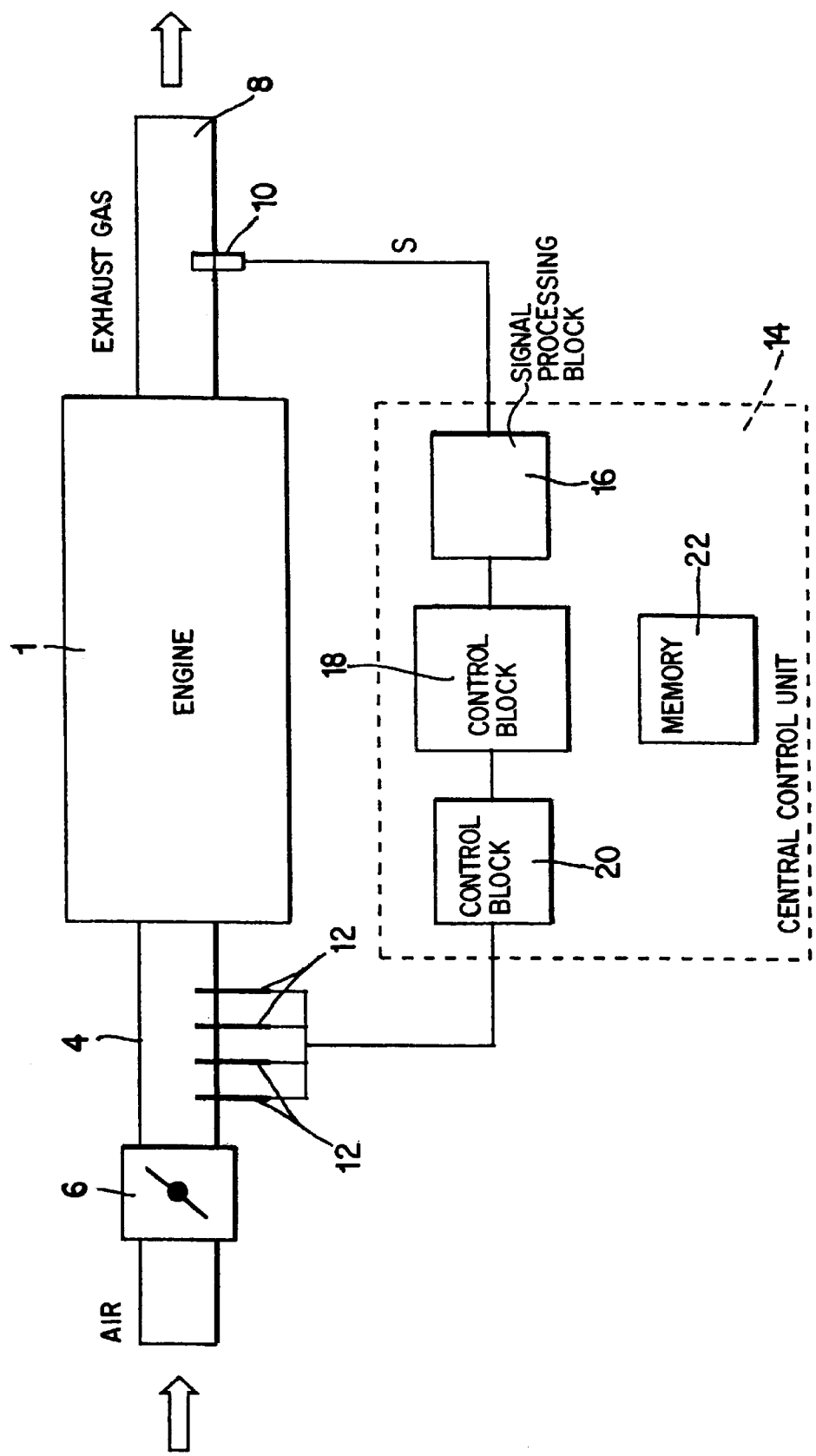
FIG. 1 shows a simplified diagram of an internal combustion engine and connected parts.

Number 1 in FIG. 1 indicates an internal combustion engine of a vehicle (not shown) comprising an air intake conduit 4 for feeding air into the combustion chambers of the cylinders of engine 1 and fitted with a butterfly valve 6 for regulating the amount of air supplied to engine 1; and an exhaust conduit 8 for discharging the exhaust gases produced by engine 1 and fitted with an oxygen concentration (lambda) sensor 10 for generating a composition signal S correlated to the stoichiometric composition of the exhaust gases and containing information relative to the difference in quality between the fuel actually used and the reference fuel used for calibration.

A number of injectors 12 are located along, and provide for injecting fuel into, intake conduit 4.

Fuel injection of engine 1 is controlled by a central control unit 14, which receives the composition signal generated by oxygen concentration sensor 10 and a number of information signals correlated to engine quantities, such as engine speed and load, determined on engine 1, and which generates output signals for driving injectors 12.

More specifically, central control unit 14—of which are shown only the parts pertinent to the present invention—comprises a signal processing block 16, which receives the composition signal S generated by oxygen concentration sensor 10, and supplies the exhaust concentration at each engine cycle.

More specifically, signal processing block 16 stores the oxygen concentration sensor 10 characteristic used to determine exhaust concentration values as a function of the amplitude of the composition signal.

Central control unit 14 also comprises a control block 18 for performing a known proportional-integral control function (not described in detail), and which receives the exhaust concentration values from signal processing block 16, and supplies, at each engine cycle, an operating value KP of a control parameter KO2 by which to determine injection times for each of injectors 12.

Central control unit 14 also comprises a control block 20, which receives the operating values KP of control parameter KO2, and generates signals for driving each injector 12 in each operating state of engine 1, as described in detail later on.

Central control unit 14 also comprises a memory 22 for storing a first value map—hereinafter referred to as a reference map—containing a number of reference values KR of control parameter KO2, each of which is related to a respective operating state of engine 1 defined by the speed and load of the engine, and is determined at the initial engine 1 calibration stage using a reference fuel; a second value map—hereinafter referred to as a calibration map—containing calibration injection times TJC for each injector 12 in each operating state of engine 1, which are defined at the initial engine 1 calibration stage using a reference fuel; and a third value map—hereinafter referred to as a correction map—which is updated periodically by central control unit 14 as described in detail later on, and contains applied correction injection times TJFA for each injector 12 in each operating state of engine 1, which are calculated as described later on, and indicate the injection correction required in each operating state of engine 1 to take into account the difference between the fuel actually used and the reference fuel used to calibrate engine 1 and calculate calibration injection times TJC.

At the engine 1 calibration stage, the values of applied correction injection times TJFA in the correction map are obviously zero values.

Each of the above maps is defined by a respective two-dimensional matrix, in which each box is identified by a respective pair of engine 1 speed and load values and contains a respective memorized parameter value. It should also be pointed out that the values in boxes in the same position (i.e. in the same row and column) in the reference, calibration and correction maps are related to one another by relating to the same engine state.

Memory 22 also stores a first threshold value TH1, a second threshold value TH2 higher than TH1, a proportion coefficient K, and a value N, which are determined at the initial engine 1 calibration stage as a function of the speed and load of the engine, and the significance of which will be made clear later on.

According to the present invention, in each operating state of engine 1, control block 20 generates the signals for driving each injector 12 as a function of an operating injection time TJO, which equals the sum of three contributions relative to the operating state of engine 1 in question, namely: a calibration injection time TJC; a closed-loop injection time TJS calculated in known manner (not described in detail) as a function of an operating value KP of the control parameter KO2 relative to the operating state of engine 1; and an applied correction injection time TJFA. That is:

TJO=TJC+TJS+TJFA

In other words, unlike known solutions—in which central control unit 14 generates each signal for driving injectors 12 in each operating state of engine 1 as a function of an operating injection time TJO which only equals the sum of calibration injection time TJC and closed-loop injection time TJS—central control unit 14 performs the operations described below with reference to FIG. 2 to determine the quality of the fuel actually used and to accordingly update the correction map used to adapt injection to any variations in the quality of the fuel used.

Figure 2:
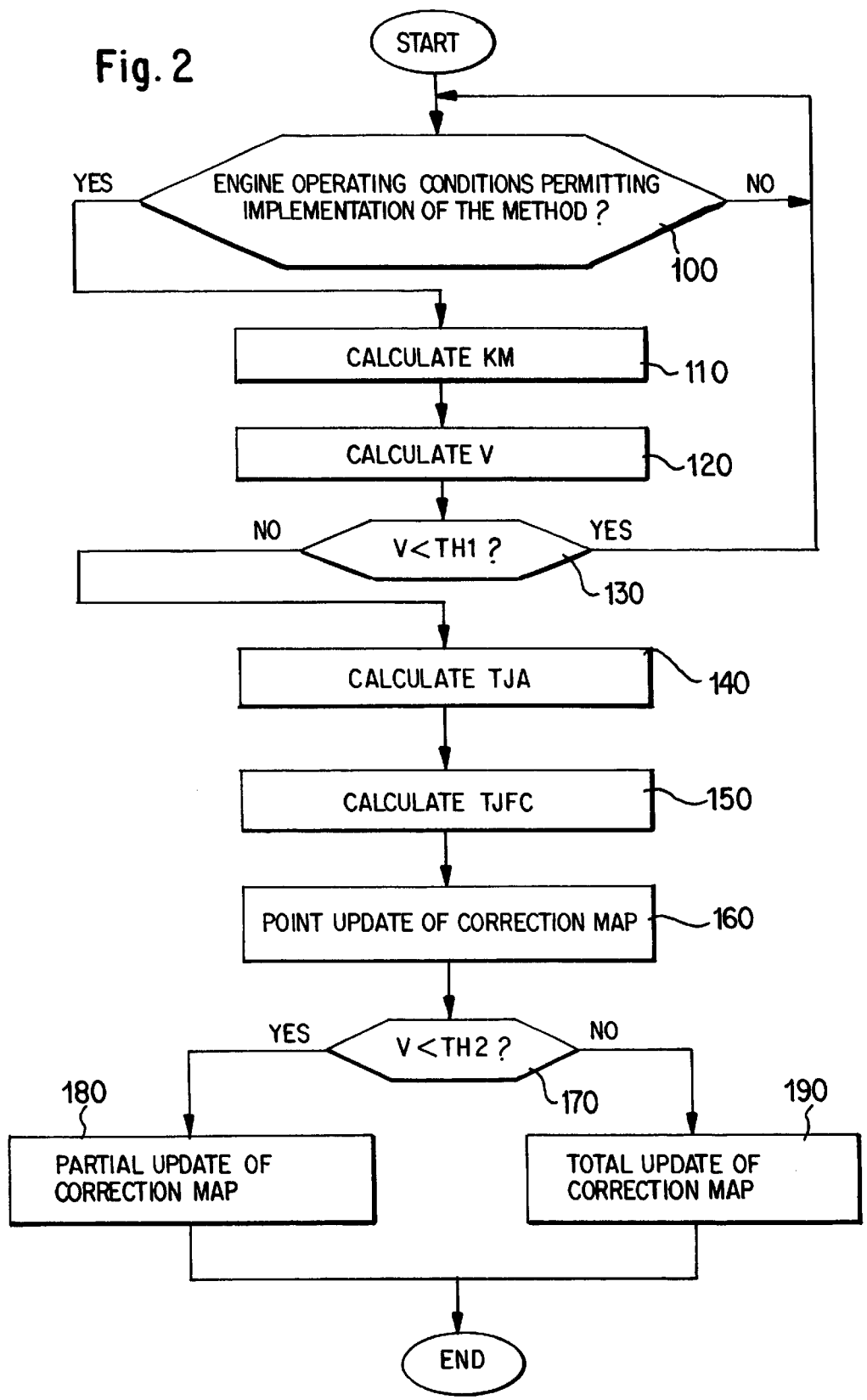
FIG. 2 shows a block diagram of the control method according to the present invention.

As shown in FIG. 2, in a first block 100, central control unit 14 determines whether the current operating state of engine 1 features engine operating conditions permitting reliable interpretation of the information from oxygen concentration sensor 10 and, hence, implementation of the method according to the present invention.

More specifically, the information from oxygen concentration sensor 10 is deemed reliable when engine 1 is in the steady operating state, i.e. the speed and load of the engine remain within respective calibratable ranges for a predetermined time; engine 1 is thermally stable; the voltage of the vehicle battery (not shown) is correct; and there are no faults on engine 1, oxygen concentration sensor 10, injectors 12 or central control unit 14. Such conditions may be determined, for example, by reading the logic states of corresponding logic flags stored in memory 22.

If the information from oxygen concentration sensor is reliable (YES output of block 100), block 100 goes on to a block 110; conversely, if the information from oxygen concentration sensor 10 is not reliable (NO output of block 100), block 100 goes back to its own input to repeat the check until the information from oxygen concentration sensor 10 is deemed reliable.

Block 110 calculates an intermediate value KM of control parameter KO2 as the mean value of N number of operating values KP of operating parameter KO2 supplied by control block 18 in the current operating state of engine 1, and wherein N is the numeric value memorized in memory 22 at the engine 1 calibration stage.

Block 110 then goes on to a block 120, in which central control unit 14 determines, as an absolute value, the variation V in the intermediate value KM of control parameter KO2 with respect to the reference value KR of control parameter KO2 relative to the current operating state of engine 1.

More specifically, if values KM and KR of control parameter KO2 are expressed as a percentage, variation V is calculated according to the equation:

|V|=|(KM−KR)|

Otherwise, variation V is calculated according to the equation:

|V|=|(KM−KR)/KR|

Block 120 then goes on to a block 130 in which central control unit 14 determines whether variation V is below first threshold value TH1—which may, for example, equal 5%—stored in memory 22.

If variation V is below first threshold value TH1 (YES output of block 130), this means the normal operating fuel of engine 1 is substantially identical with the reference fuel used to calibrate the engine (so that no fuel injection correction is required), and block 130 goes back to block 100.

In which case, central control unit 14 therefore continues calculating operating injection times TJO of injectors 12 using the applied correction injection times TJFA stored beforehand in the correction map.

Conversely, if variation V is above first threshold value TH1 (NO output of block 130), this means the fuel actually used differs from the reference fuel used to calibrate the engine (thus requiring fuel injection correction), and block 130 goes on to a block 140.

In block 140, central control unit 14 determines an additional injection time TJA as a function of reference value KR and intermediate value KM of control parameter KO2.

More specifically, if values KM and KR of control parameter KO2 are expressed as a percentage, additional injection time TJA is calculated according to the equation:

TJA=K*(KR−KM)  1a)

Otherwise, additional injection time TJA is calculated according to the equation:

TJA=K*(KR−KM)/KR  1b)

where K is the proportion coefficient stored in memory 22.

Block 140 then goes on to a block 150 in which central control unit 14 determines a current correction injection time TJFC relative to the current operating state of engine 1 and equal to the memorized applied correction injection time TJFA plus the additional injection time, according to the equation:

TJFC=TJFA+TJA  2)

Block 150 then goes on to a block 160 in which central control unit 14 effects a point update of the correction map in which the memorized applied correction injection time TJFA relative to the current operating state of engine 1 is made equal to the calculated current correction injection time TJFC, i.e. TJFA=TJFC.

The current correction injection time TJFC so memorized therefore becomes the new applied correction injection time TJFA relative to the current operating state of engine 1, and which is used for calculating operating injection times TJO in subsequent engine cycles, and for calculating the next current correction injection time TJFC.

Block 160 then goes on to a block 170 in which central control unit 14 determines whether variation V is below second threshold value TH2—which may, for example, equal 10%—stored in memory 22 (i.e. determines whether variation V falls between first and second threshold values TH1, TH2).

If variation V is below second threshold value TH2 (YES output of block 170), block 170 goes on to a block 180; conversely, if variation V is above second threshold value TH2 (NO output of block 170), block 170 goes on to a block 190.

In block 180, central control unit 14 effects a partial update of the correction map by also extending the block 160 update to applied correction injection times TJFA "adjacent", in the correction map, to the applied correction injection time TJFA updated in block 160.

In other words, in block 180, central control unit 14 updates the correction map by extending the block 160 update to applied correction injection times TJFA in correction map boxes physically adjacent to the one containing the applied correction injection time TJFA updated in block 160; i.e. to applied correction injection times TJFA relative to operating states of engine 1 close to the current operating state of engine 1.

The applied correction injection times TJFA adjacent to the one updated directly may, for example, be those in correction map boxes immediately adjacent to, i.e. separated by a distance of one from, and defining a first frame about the box containing the applied correction injection time TJFA updated directly, and/or may be those in correction map boxes separated by a distance of two from and defining a second frame about said box, or those located within a correction map area having a predetermined shape at the engine 1 calibration stage and containing the box containing the applied correction injection time TJFA updated directly.

More specifically, in block 180, central control unit 14 determines, for each applied correction injection time TJFA to be updated, a respective additional injection time TJA according to equation 1a) or 1b) (i.e. wherein the reference value KR of control parameter KO2 is related to the engine 1 operating state corresponding to the applied correction injection time TJFA to be updated) and a respective current correction injection time TJFC according to equation 2), and then makes the applied correction injection times TJFA to be updated equal to the respective current correction injection times TJFC.

In block 190, on the other hand, central control unit 14 effects a total update of the correction map by also extending the block 160 update to all the other applied correction injection times TJFA memorized in the correction map.

More specifically, for each of the other applied correction injection times TJFA memorized in the correction map, central control unit 14 calculates a respective additional injection time TJA according to equation 1a) or 1b), and a respective current correction injection time TJFC according to equation 2), and then makes the applied correction injection times TJFA to be updated equal to the respective current correction injection times TJFC.

The updated correction map is then used by central control unit 14 to calculate subsequent operating injection times TJO.

Depending on the maker's choice, the operations described above with reference to blocks 100–190 may either be performed whenever the conditions described with reference to block 100 are determined, or only once, each time engine 1 is turned on.

The advantages of the control method according to the present invention will be clear from the foregoing description.

In particular, the control method according to the present invention provides for fully automatically recognizing the quality of any type of gaseous or liquid fuel, and for adapting injection as a function of a variation in fuel quality.

The control method according to the present invention also provides for minimizing any loss in performance of the engine, and for maintaining emissions within legal limits.

Clearly, changes may be made to the control method as described and illustrated herein without, however, departing from the scope of the present invention.

For example, block 100—in which central control unit 14 determines the presence of engine 1 operating conditions permitting reliable interpretation of the information from oxygen concentration sensor 10—need not determine a steady operating state of engine 1. In which case, in calculating intermediate value KM, central control unit 14, as opposed to the preceding N values of control parameter KO2, will only take into account N values relative to the same operating state of engine 1, or to operating states of engine 1 differing in a way which has no effect on the calculation of intermediate value KM.

Moreover, intermediate value KM may be calculated as a function of the N operating values KP of operating parameter KO2 in a way other than that described.

What is claimed is:

1. A method of controlling injection of an internal combustion engine comprising a number of injectors for injecting fuel for a respective operating injection time (TJO) in each operating state of the engine, and an oxygen concentration sensor generating a composition signal (S) correlated to the oxygen difference in the exhaust gases with respect to a stoichiometric condition; each of said injectors being assigned, in each operating state of the engine, a respective calibration injection time (TJC) determined at an initial engine calibration stage using a reference fuel; for a given operating state of said engine, said method comprising the steps of:

a) determining a number (N) of operating values (KP) of a control parameter (KO2) as a function of said composition signal (S) and of a proportional-integral control function;

b) determining an intermediate value (KM) of said control parameter (KO2) as a function of said number (N) of operating values (KP) of the control parameter (KO2);

c) determining a current correction injection time (TJFC) as a function of said intermediate value (KM) of said control parameter (KO2) and of a reference value (KR) of the control parameter (KO2) determined at said initial engine calibration stage using said reference fuel and relative to said operating stage of the engine; and d) determining said operating injection time (TJO) for said operating state of the engine as a function of a respective said calibration injection time (TJC); of a closed-loop injection time (TJS) depending on said composition signal (S); and of said current correction injection time (TJFC).

2. A method as claimed in claim 1, wherein said step b) comprises the step of:
   b1) determining said intermediate value (KM) of said control parameter (KO2) as a function of the mean value of said number (N) of the operating values (KP) of the control parameter (KO2).

3. A method as claimed in claim 1, wherein said operating values (KP) of said control parameter (KO2) are determined in said operating state of the engine.

4. A method as claimed in claim 1, wherein said step c) comprises the steps of:
   c1) calculating an additional injection time (TJA) as a function of said intermediate value (KM) and of said reference value (KR) of said control parameter (KO2); and
   c2) calculating said current correction injection time (TJFC) as a function of said additional injection time (TJA) and of a memorized applied correction injection time (TJFA) relative to said operating state of the engine.

5. A method as claimed in claim 4, wherein said step c1) comprises the step of:
   c11) calculating said additional injection time (TJA) according to the equation:

$$TJA=K*(KR-KM)$$

if said intermediate value (KM) and said reference value (KR) are expressed as a percentage, or otherwise calculating said additional injection time (TJA) according to the equation:

$$TJA=K*(KR-KM)/KR$$

where KM is said intermediate value, KR is said reference value, and K is a proportion coefficient.

6. A method as claimed in claim 4, wherein said step c2) comprises the step of:
   c21) calculating said current correction injection time (TJFC) according to the equation:

$$TJFC=TJFA+TJA$$

where TJFC is said current correction injection time, TJFA is said applied correction injection time, and TJA is said additional injection time.

7. A method as claimed in claim 4, wherein said step c) also comprises the step of:
   c3) after said step c2), modifying said applied correction injection time (TJFA) as a function of said current correction injection time (TJFC).

8. A method as claimed in claim 7, wherein said step c3) comprises the step of:
   c31) after said step c2), making said applied correction injection time (TJFA) equal to said current correction injection time (TJFC).

9. A method as claimed in claim 7, wherein said step d) comprises the step of:
   d1) determining said operating injection time (TJO) according to the equation:

$$TJO=TJC+TJS+TJFA$$

where TJO is said operating injection time, TJC is said calibration injection time, TJS is said stoichiometric injection time, and TJFA is said applied correction injection time.

10. A method as claimed in claim 4, further comprising the steps of:
    e) calculating the variation (V) between said reference value (KR) and said intermediate value (KM) of said operating parameter (KO2);
    f) comparing said variation (V) with at least a first threshold value (TH1); and
    g) performing said steps c) and d) in the event said variation (V) has a first predetermined relationship with said first threshold value (TH1).

11. A method as claimed in claim 10, further comprising the step of:
    h) determining said operating injection time (TJO) as a function of said calibration injection time (TJC), of said closed-loop injection time (TJS), and of said applied correction injection time (TJFA) in the event said variation (V) does not have said first predetermined relationship with said first threshold value (TH1).

12. A method as claimed in claim 11, wherein said first predetermined relationship is defined by the condition that said variation (V) be above said first threshold value (TH1).

13. A method as claimed in claim 10, wherein each operating state of the engine is assigned a respective memorized said applied correction injection time (TJFA); and by also comprising the steps of:
    i) comparing said variation (V) with a second threshold value (TH2) greater than said first threshold value (TH1);
    l) in the event said variation (V) has a second predetermined relationship with said first and second threshold values (TH1, TH2), determining, for a number of operating states of the engine other than said operating state of the engine, respective current correction injection times (TJFC) as a function of said intermediate value (KM) of said control parameter (KO2), and of respective reference values (KR) of the control parameter (KO2) determined at said initial engine calibration stage using said reference fuel and relative to said operating states of the engine; and
    m) modifying the applied correction injection times (TJFA) relative to said different operating states of the engine as a function of the respective said current correction injection times (TJFC).

14. A method as claimed in claim 13, wherein said step m) comprises the step of:
    m1) making the applied correction injection times (TJFA) relative to said different operating states of the engine equal to the respective said current correction injection times (TJFC).

15. A method as claimed in claim 13, further comprising the steps of:
    n) in the event said variation (V) does not have said second predetermined relationship with said first and second threshold values (TH1, TH2), determining, for all the operating states of the engine other than said operating state of the engine, respective current correction injection times (TJFC) as a function of said intermediate value (KM) of said control parameter (KO2), and of respective reference values (KR) of the control parameter (KO2) determined at said initial engine calibration stage using said reference fuel; and
    o) modifying the applied correction injection times (TJFA) relative to all the operating states of the engine as a function of the respective said current correction injection times (TJFC).

16. A method as claimed in claim 15, wherein said step o) comprises the step of:
    o1) making the applied correction injection times (TJFA) relative to all the operating states of the engine equal to the respective said current correction injection times (TJFC).

17. A method as claimed in claim 13, wherein said second predetermined relationship is defined by the condition that said variation (V) be between said first and second threshold values (TH1, TH2).

18. A method as claimed in claim 1, further comprising the step of:
   p) performing said steps b), c), and d) in the presence of predetermined operating conditions of said engine.

19. A method as claimed in claim 18, wherein said predetermined operating conditions comprise a steady operating state condition of the engine.

20. A method as claimed in claim 18, wherein said predetermined operating conditions comprise a thermally stable condition of the engine.

21. A method as claimed in claim 18, wherein said predetermined operating conditions comprise the absence of faults on said engine, said injectors, and said oxygen concentration sensor.

22. A method as claimed in claim 18, wherein said predetermined operating conditions comprise a correct battery voltage.

* * * * *